United States Patent
Awasa

(10) Patent No.: US 9,932,084 B2
(45) Date of Patent: Apr. 3, 2018

(54) DIAPHRAGM UNIT AND SUSPENSION

(71) Applicant: Showa Corporation, Gyoda-shi (JP)

(72) Inventor: Shigeki Awasa, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/866,184

(22) Filed: Sep. 25, 2015

(65) Prior Publication Data

US 2016/0096585 A1    Apr. 7, 2016

(30) Foreign Application Priority Data

Oct. 3, 2014  (JP) .................. 2014-205030

(51) Int. Cl.
| | |
|---|---|
| B62K 25/28 | (2006.01) |
| F16F 9/04 | (2006.01) |
| F16F 9/05 | (2006.01) |
| B60C 15/06 | (2006.01) |
| B60G 15/12 | (2006.01) |
| F16F 13/00 | (2006.01) |

(52) U.S. Cl.
CPC ............ B62K 25/283 (2013.01); B60C 15/06 (2013.01); B60G 15/12 (2013.01); F16F 9/0454 (2013.01); F16F 9/05 (2013.01); F16F 13/002 (2013.01); *B60G 2202/314* (2013.01)

(58) Field of Classification Search
CPC .......... F16F 9/084; F16F 9/088; F16F 9/3242; F16F 9/38; B60G 15/12; B60G 2202/314
See application file for complete search history.

(56) References Cited

U.S. PATENT DOCUMENTS

| | | | | |
|---|---|---|---|---|
| 4,022,448 A | * | 5/1977 | Reeder .................... | F16F 9/084 188/269 |
| 4,392,638 A | * | 7/1983 | Kato ....................... | F16F 9/084 188/322.12 |
| 4,555,096 A | * | 11/1985 | Pryor ..................... | B60G 15/14 267/220 |
| 5,009,401 A | * | 4/1991 | Weitzenhof ............ | B60G 15/14 188/321.11 |

(Continued)

FOREIGN PATENT DOCUMENTS

JP    2007-203858 A    8/2007

OTHER PUBLICATIONS

Extended European Search Report dated Mar. 7, 2016 for the corresponding European Patent Application No. 15187039.1.

*Primary Examiner* — Bradley T King
(74) *Attorney, Agent, or Firm* — Leason Ellis LLP

(57) ABSTRACT

A diaphragm unit detachably attached to a damper body, includes: a cylinder in which a liquid is sealed; a piston rod having a piston sliding inside the cylinder on one end side of the piston rod, in which other end side of the piston rod is extended to an outside of the cylinder; and a rod guide having a bottomed cylindrical shape wherein an insertion opening into which the piston rod is inserted is provided at a bottom portion of the rod guide, the rod guide being fixed to a side of an opening of the cylinder into which the piston is inserted to thereby make the piston rod be slidably inserted in a liquid tight manner, the diaphragm unit further comprising: an end member; an air seal; a rod side member; an annular bump rubber; and a tubular diaphragm, as defined herein.

27 Claims, 7 Drawing Sheets

(56) References Cited

U.S. PATENT DOCUMENTS

| | | | |
|---|---|---|---|
| 7,175,165 B1 | 2/2007 | Vande Brake et al. | |
| 9,206,874 B2 * | 12/2015 | Sugata | B60G 15/12 |
| 2005/0067242 A1 * | 3/2005 | Vanmechelen | F16F 9/3242 |
| | | | 188/322.17 |
| 2007/0126163 A1 | 6/2007 | Leonard et al. | |
| 2007/0175691 A1 | 8/2007 | Gogo et al. | |
| 2008/0006974 A1 * | 1/2008 | Stahmer | F16F 9/05 |
| | | | 267/64.11 |
| 2011/0101578 A1 | 5/2011 | Ji | |
| 2014/0167385 A1 | 6/2014 | Gogo et al. | |
| 2014/0175716 A1 | 6/2014 | Sugata | |

* cited by examiner

DIAPHRAGM UNIT AND SUSPENSION

CROSS-REFERENCE TO RELATED APPLICATIONS

This application claims the benefit of Japanese Patent Application JP 2014-205030, filed Oct. 3, 2014, the entire content of which is hereby incorporated by reference, the same as if set forth at length.

BACKGROUND OF THE INVENTION

1. Field of the Invention

The present invention relates to a diaphragm unit and a suspension.

2. Description of Related Art

A motorcycle in a related art has a suspension from a standpoint of riding comfort and so on. FIG. 7 is a view showing a vertical cross section of a suspension 200 provided on a rear-wheel side of the motorcycle in the related art.

The suspension 200 in the related art includes a cylinder 210 attached to a vehicle body side and a piston rod 220 attached to the axle side and slidably inserted into an oil chamber 216 of the cylinder 210 as shown in FIG. 7. The suspension 200 further includes a coil spring 230 provided in outer peripheries of the cylinder 210 and the piston rod 220.

The cylinder 210 has a double tube structure including an outer cylinder 210a and an inner cylinder 210b, having a vehicle body side mounting member 211 above the outer cylinder 210a. A piston 222 fixed by a nut 221 is provided on an upper side of the piston rod 220, and an axle side mounting member 223 is provided on a lower side thereof.

A spring load adjustment nut 231 is arranged in the outer periphery of the cylinder 210, and a spring bearing 232 supported by the spring load adjustment nut 231. A spring bearing 234 is provided on an upper side of the axle side mounting member 223. In an outer side portion of the spring bearing 234, a spring bearing guide 233 is provided. The coil spring 230 is provided between the spring bearing 232 and the spring bearing guide 233.

A lower part of the cylinder 210 is opened, and a rod guide 212 through which the piston rod 220 pierces is provided in an opening thereof as shown in FIG. 7. The rod guide 212 has an annular shape and provided at an inner peripheral portion of the cylinder 210 in a liquid tight manner. An oil seal 213 is provided at an inner peripheral portion of the rod guide 212, which allows the piston rod 220 to slide freely in a liquid tight manner.

An end plate 214 is provided in the opening of the cylinder 210 which is under the rod guide 212. An upper end surface of the end plate 214 abuts on the rod guide 212. The end plate 214 has an annular shape and is provided in the inner peripheral portion of the cylinder 210 in the liquid tight manner. A dust seal 215 is provided at an inner peripheral portion of the end plate 214, which prevents intrusion of dust.

A damping force generating apparatus 240 and a reservoir 241 communicating to the damping force generating apparatus 240 are arranged in series on an upper portion of the outer cylinder 210a where the vehicle body side mounting member 211 is formed. The damping force generating apparatus 240 communicates to a piston side oil chamber 216a and a rod side oil chamber 216b inside the cylinder 210. The damping force generating apparatus 240 adjusts a compression side damping force and an extension side damping force. The reservoir 241 compensates volume of the piston rod 220 moving forward and backward in the oil chamber of the cylinder 210 (including volume increased by temperature expansion of oil).

In the suspension 200 in the related art having the above structure, the piston 222 moves forward and backward in the oil chamber of the cylinder 210, thereby absorbing and damping vibration inputted from a road surface when a vehicle runs. Also, a spring force of the coil spring 230 absorbs an impact force received by the vehicle from the road surface and reduces transmission of vibration to the vehicle.

As a spring constant in the coil spring 230 is fixed in the suspension 200 in the related art, it is necessary to replace the coil spring 230 with one having a different spring constant for changing a reaction force. It is also necessary to remove the suspension 200 from a vehicle body (not shown) at the time of replacing the coil spring 230, the work is complicated.

Here, as structure of the suspension, there is air spring structure in which a diaphragm is provided around part of the cylinder and the piston rod 220 to form an air chamber and the reaction force is generated by using a pressure of the air inside the air chamber.

When the coil spring structure is compared with the air spring structure, a load of the coil spring 230 is heavier than members forming the air chamber, therefore, an inertia force and a bending load acting on the suspension are higher in the coil spring structure than in the air spring structure. Accordingly, actuation performance of a stroke in the coil spring structure is worse than in the air spring structure. Therefore, the air spring structure is preferable to the coil spring structure for adjusting the reaction force easily and for improving the actuation performance of the stroke.

SUMMARY OF THE INVENTION

However, it is necessary to remove the dust seal and to replace the oil seal with a sealing member having sealing functions for both oil and air for changing the related-art suspension having the coil spring structure to the suspension having the air spring structure. Accordingly, significant change in structure is necessary for changing an existing suspension having the coil spring to the suspension having the air spring structure.

The present invention has been made in view of the above, and an object thereof is to provide a diaphragm unit and a suspension including the diaphragm unit capable of changing the existing suspension having the coil spring structure to the suspension having the air spring structure easily.

A diaphragm unit according to an embodiment is detachably attached to a damper body, including: a cylinder in which a liquid is sealed; a piston rod having a piston sliding inside the cylinder on one end side of the piston rod, in which other end side of the piston rod is extended to an outside of the cylinder; and a rod guide having a bottomed cylindrical shape wherein an insertion opening into which the piston rod is inserted is provided at a bottom portion of the rod guide, the rod guide being fixed to a side of an opening of the cylinder into which the piston is inserted to thereby slidably insert the piston rod in a liquid tight manner.

The diaphragm unit further includes an end member having a bottomed cylindrical shape wherein an insertion opening into which the piston rod is inserted is provided at a bottom portion of the end member, the end member being detachably fitted to an outer periphery of the cylinder or the rod guide so as to cover the opening of the cylinder or the rod guide, an air seal provided at an inner peripheral portion of the insertion opening of the end member, a rod side member having a bottomed cylindrical shape wherein an insertion opening into which the piston rod is inserted is provided at a bottom portion of the rod side member, the rod side member being provided in a position around the other end side of the piston rod, an annular bump rubber fixed to an inner bottom portion of the rod side member and having a through hole into which the piston rod is inserted, and a tubular diaphragm fixed to the end member at one end of the diaphragm and fixed to the rod side member at other end of the diaphragm.

The present invention can provide a diaphragm unit and a suspension having the diaphragm unit capable of changing an existing suspension having a coil spring structure to a suspension having an air spring structure easily.

DESCRIPTION OF EMBODIMENTS

Hereinafter, embodiments of the present invention will be explained with reference to the drawings.

Figure 1:
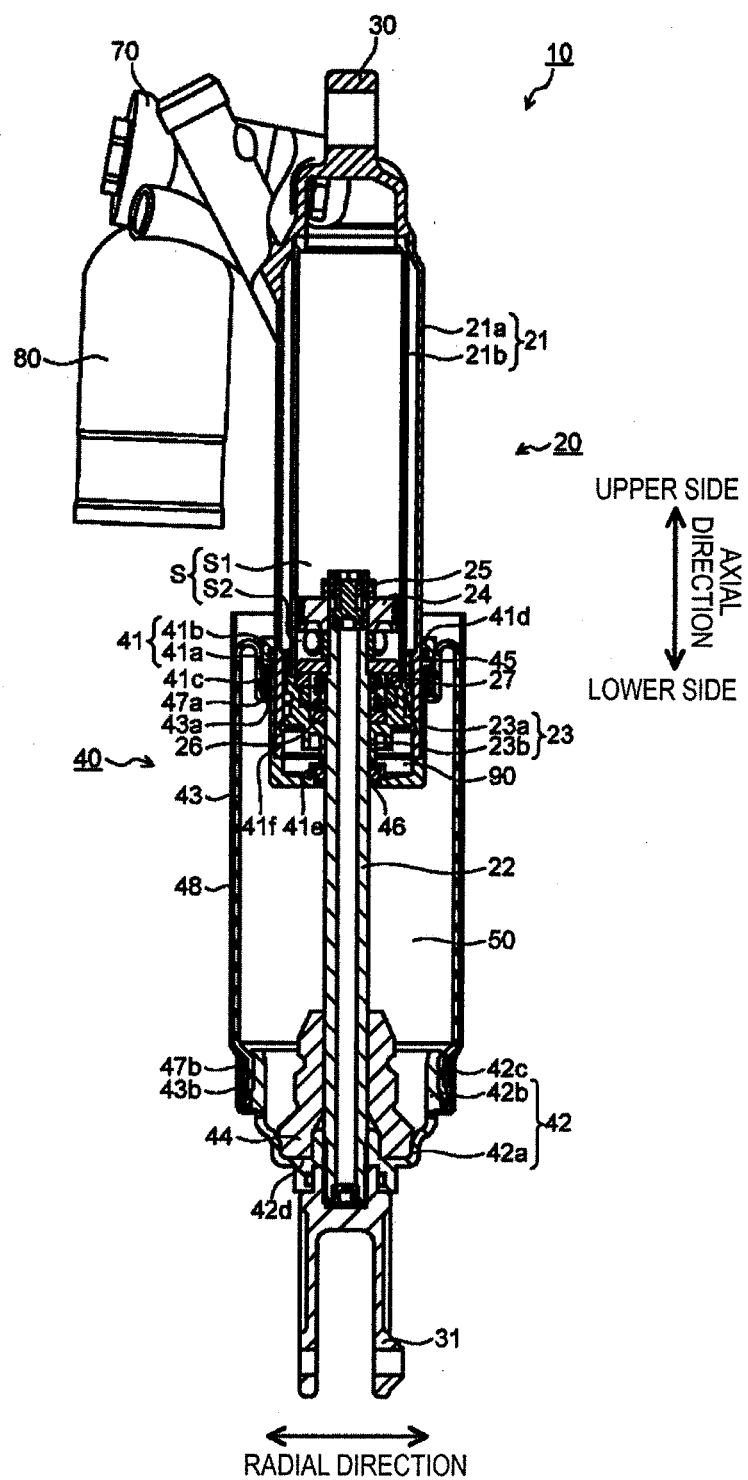
FIG. 1 is a view showing a vertical cross section of a suspension according to an embodiment.
Figure 2:
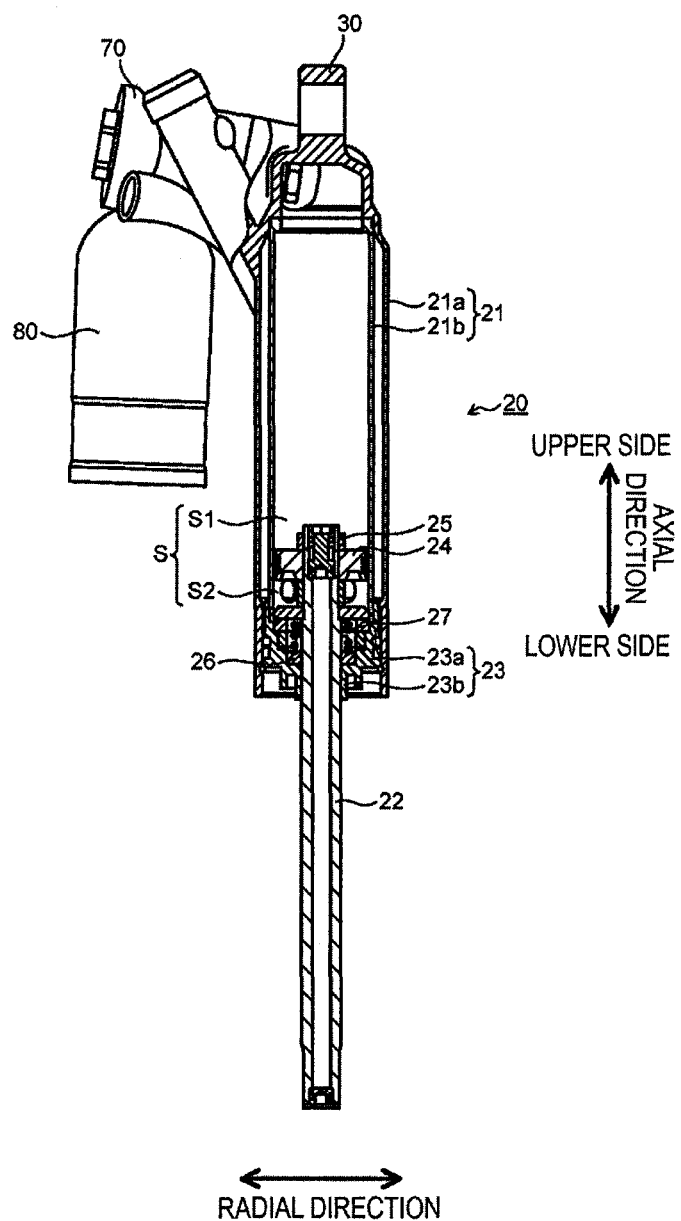
FIG. 2 is a view showing a vertical cross section of a damper body of the suspension according to the embodiment.
Figure 3:
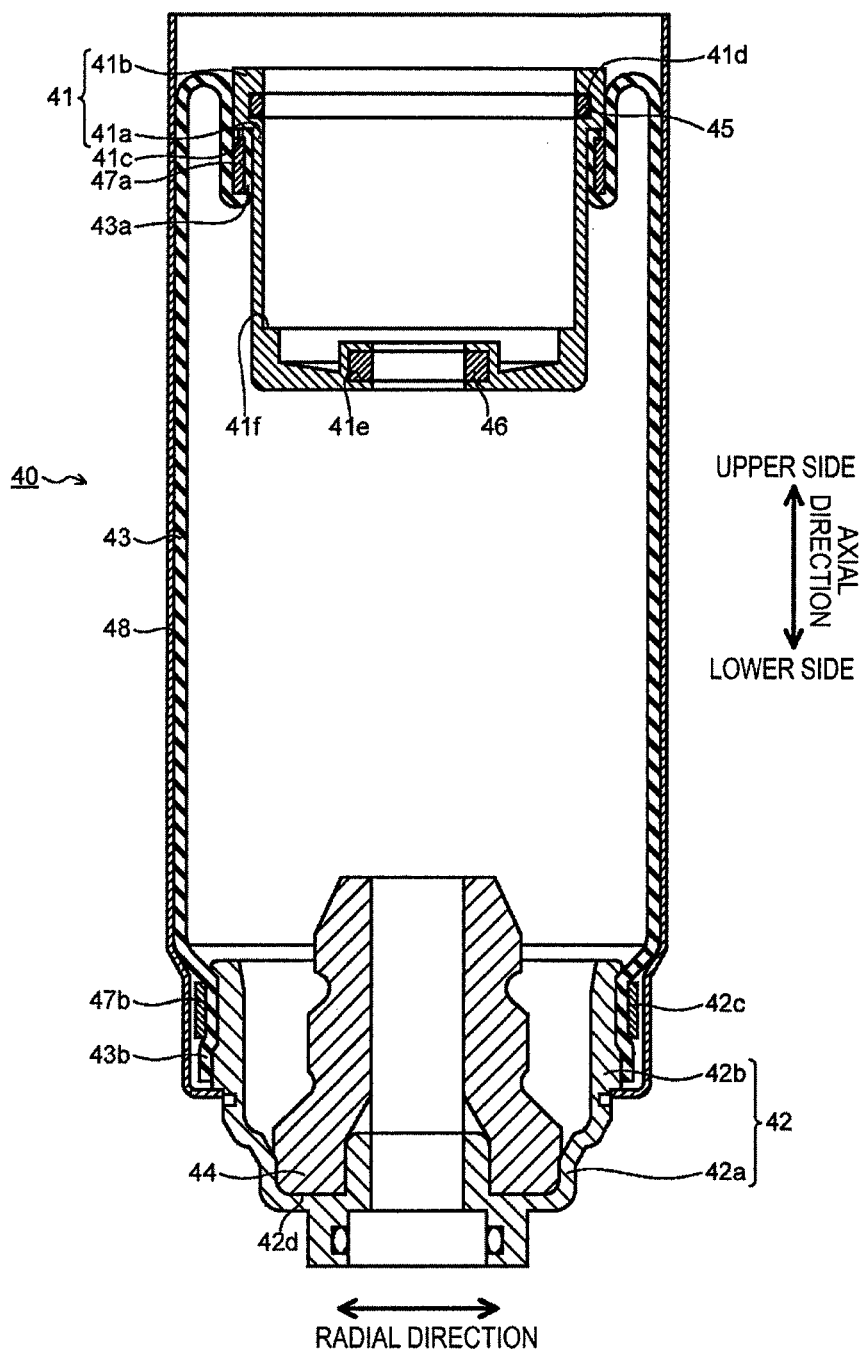
FIG. 3 is a view showing a vertical cross section of a diaphragm unit of the suspension according to the embodiment.

FIG. 1 is a view showing a vertical cross section of a suspension 10 according to an embodiment. FIG. 2 is a view showing a vertical cross section of a damper body 20 of the suspension 10 according to the embodiment. FIG. 3 is a view showing a vertical cross section of a diaphragm unit 40 of the suspension 10 according to the embodiment. FIG. 1 and FIG. 2 show a state where the suspension 10 is extended to the maximum.

The suspension 10 includes the damper body 20 and the diaphragm unit 40 as shown in FIG. 1. The suspension 10 is a so-called damper with an air spring. The diaphragm unit 40 is attached to the damper body 20 so as to be detachable.

First, structure of the damper body 20 will be explained.

The damper body 20 includes a cylinder 21, a piston rod 22 inserted into the cylinder 21 and a rod guide 23 supporting the piston rod 22 as shown in FIG. 1 and FIG. 2.

The cylinder 21 is formed in a double tube, for example, including an outer cylinder 21a and an inner cylinder 21b as shown in FIG. 2. An upper end (upper end in an axial direction) of the outer cylinder 21a is closed and a lower end (lower end in the axial direction) of the outer cylinder 21a is opened. In the upper end of the outer cylinder 21a, a communication hole (not shown) communicating to a later-described damping force generating apparatus 70 is formed.

The cylinder 21 includes, for example, a vehicle body side mounting member 30 in an upper part (upper part in the axial direction) integrally. Here, the axial direction means a direction of a center axis of the cylinder 21 and the piston rod 22 which have the same axis (the same applies hereinafter).

An upper end and a lower end of the inner cylinder 21b are opened. The upper end of the inner cylinder 21b abuts on, for example, an upper-end inner surface of the outer cylinder 21a, and the lower end of the inner cylinder 21b abuts on a step portion in an upper-end inner periphery of the rod guide 23.

The piston rod 22 has a piston 24 in an upper side (one end side) and an axle side mounting member 31 in a lower side (the other end side) protruding to an outside from the cylinder 21. The piston 24 is fixed by, for example, a nut 25, which is slidably inserted into the inner cylinder 21b of the cylinder 21. An oil chamber S in the inner cylinder 21b is sectioned into a piston side oil chamber S1 and a rod side oil chamber S2 by the piston 24.

The axle side mounting member 31 is attached to a lower end of the piston rod 22 by, for example, screwing or the like so as to be detachable. For example, the vehicle body side mounting member 30 is connected to the vehicle body side of the vehicle, and the axle side mounting member 31 is connected to the axle side of the vehicle, thereby interposing suspension 10 between the vehicle body and a swing arm mounted to a vehicle wheel. Then, the damper body 20 exerts a damping force by relative movement in the axial direction, namely, extension/contraction of the cylinder 21 and the piston rod 22, thereby suppressing vibration of the vehicle body.

The rod guide 23 is fixed to, for example, an inner periphery of an opening in the lower end of the outer cylinder 21a in a liquid tight manner as shown in FIG. 2. The rod guide 23 includes a large-diameter cylindrical portion 23a in an upper part and a small-diameter cylindrical portion 23b in a lower part. The small-diameter cylindrical portion 23b has a bottom portion. As described above, the rod guide 23 has, for example, a bottomed cylindrical shape. In the bottom portion of the small-diameter cylindrical portion 23b, an insertion opening into which the piston rod 22 is inserted is provided.

A center axis of the large-diameter cylindrical portion 23a and a center axis of the small-diameter cylindrical portion 23b are on the same axis. An oil seal 26 is provided at an inner peripheral portion of the small-diameter cylindrical portion 23b of the rod guide 23, which allows the piston rod 22 to be slidable in a liquid tight manner. Furthermore, for example, a lower end of the inner cylinder 21b is fitted into the large-diameter cylindrical portion 23a of the rod guide 23.

The damper body 20 is provided with a rebound spring 27 restricting an extension side stroke around the piston rod 22 as well as between the piston 24 and the rod guide 23.

Here, the damping force generating apparatus 70 and a reservoir 80 communicating to the damping force generating apparatus 70 are provided in series in an upper part of the outer cylinder 21b where the vehicle body side mounting member 30 is formed. The damping force generating apparatus 70 communicates to the piston side oil chamber S1 and the rod side oil chamber S2 inside the cylinder 21. Accordingly, the reservoir 80 communicates to the piston side oil chamber S1 and the rod side oil chamber S2 through the damping force generating apparatus 70. The damping force generating apparatus 70 adjusts the compression-side damping force and the extension-side damping force. The reservoir 80 compensates volume of the piston rod 22 moving forward and backward in the oil chamber S of the cylinder 21 (including volume increased by temperature expansion of oil).

Next, the diaphragm unit 40 will be explained.

The diaphragm unit 40 includes an end member 41, a rod side member 42, a diaphragm 43 and a bump rubber 44 as shown in FIG. 1 and FIG. 3. The end member 41, the rod side member 42, the diaphragm 43 and the bump rubber 44 are formed as one unit. The unit configures the diaphragm unit 40 as a single unit. Accordingly, the diaphragm unit 40 can be attached to the damper body 20 and can be removed from the damper body 20 as the diaphragm unit 40 as the single unit.

The end member 41 is detachably fitted to an outer periphery of the outer cylinder 21a so as to cover the opening of the outer cylinder 21a of the cylinder 21.

The end member 41 has a bottomed cylindrical shape as shown in FIG. 3. The end member 41 is formed so that, for example, an outer diameter of an opening side (upper part in the axial direction) is formed to be larger. That is, the end member 41 includes a small-diameter cylindrical portion 41a and a large-diameter cylindrical portion 41b, having the same inner diameter. Accordingly, a step portion 41c is formed in an outer side in the radial direction at a boundary between the small-diameter cylindrical portion 41a and the large-diameter cylindrical portion 41b. A center axis of the small-diameter cylindrical portion 41a and a center axis of the large-diameter cylindrical portion 41b are on the same axis.

At an inner peripheral portion of the large-diameter cylindrical portion 41b, a groove portion 41d is formed in a circumferential direction. An air seal 45 is fitted to the groove portion 41d. The end member 41 is fitted to the outer periphery of the outer cylinder 21a in an air tight manner by the air seal 45. An opening through which the piston rod 22 pierces is provided at a bottom portion of the small-diameter cylindrical portion 41a. At an inner peripheral portion of the opening, a groove portion 41e is formed in the circumferential direction. An air seal 46 is fitted to the groove portion 41e. The air seal 46 allows the piston rod 22 to be slidable in the air tight manner. Accordingly, an air flow into the end member 41 from a later-described air chamber 50 is prevented.

Here, when the end member 41 is fitted to the outer cylinder 21a, a gap portion 90 is formed between an inner bottom portion of the end member 41 and an outer bottom portion of the rod guide 23 as shown in FIG. 1. In the suspension 10, reaction force characteristics are affected when temperature of air of a later-described air chamber 50 changes. However, the gap portion 90 suppresses an amount of heat of the oil in the cylinder 21 to be transmitted to the air in the later-described air chamber 50. That is, the gap portion 90 functions also as a heat insulating portion. Therefore, it is possible to suppress the change in the temperature of the air in the air chamber 50 due to the temperature of oil inside the cylinder 21.

When the end member 41 is fitted to the outer cylinder 21a, the lower end of the outer cylinder 21a abuts on, for example, a step portion 41f in a lower-end inner surface of the end member 41. For example, a space capacity of the gap portion 90 can be adjusted by adjusting height of the step portion 41f in the axial direction.

The rod side member 42 is provided in a position to be a lower side of the piston rod 22. The rod side member 42 has a bottomed cylindrical shape including a small-diameter cylindrical portion 42a in a lower part and a large-diameter cylindrical portion 42b in an upper part. At a bottom portion of the small-diameter cylindrical portion 42a, an opening through which the lower side of the piston rod 22 pierces and supporting the piston rod 22 is formed. A lower end of the piston rod 22 is fixed to the axle side mounting member 31 through the opening of the small-diameter cylindrical portion 42a. A center axis of the small-diameter cylindrical portion 42a and a center axis of the large-diameter cylindrical portion 42b are on the same axis.

The rod side member 42 is provided with a pressure adjusting portion (not shown) adjusting an internal pressure of the later-described air chamber 50. The air is filled in the air chamber 50 from, for example, an air source in an outside of the suspension 10 through the pressure adjusting portion.

The diaphragm 43 is formed of a tubular elastic member. As the elastic member, rubber and so on can be used. An upper end (one end) 43a of the diaphragm 43 is fixed to, for example, an outer peripheral surface of the small-diameter cylindrical portion 41a on the large-diameter cylindrical portion 41b side of the end member 41. That is, the upper end 43a of the diaphragm 43 is fixed to the outer peripheral surface of the small-diameter cylindrical portion 41a on the step portion 41c side. Accordingly, movement of the fixing portion to an upper side in the axial direction is prevented.

A side surface of the end member 41 may be formed by one bottomed cylindrical body not including the large-diameter cylindrical portion 41b and the small-diameter cylindrical portion 41a. In such case, the upper end 43a of the diaphragm 43 is fixed to an outer side surface of the opening side (upper side) of the end member 41.

A lower end (the other end) 43b of the diaphragm 43 is fixed to an outer peripheral surface of the large-diameter cylindrical portion 42b of the rod side member 42. On the outer peripheral surface of the large-diameter cylindrical portion 42b fixing the lower end 43b of the diaphragm 43, for example, a groove portion 42c is formed in a circumferential direction. A width of the groove portion 42c is set so as to correspond to a width of a later-described caulking band 47b. As the groove portion 42c is provided, positioning of the fixing portion can be easily performed, and the movement of the fixing portion to the vertical direction (axial direction) is prevented.

Here, a mounting diameter of the large-diameter cylindrical portion 42b of the rod side member 42 to which the lower end 43b of the diaphragm 43 is fixed is set to be larger than a mounting diameter of the small-diameter cylindrical portion 41a of the end member 41 to which the upper end 43a of the diaphragm 43 is fixed in the diaphragm unit 40. An annular space is formed around the upper side (upper side in the axial direction) of the end member 41 in which the mounting diameter becomes smaller by using a difference in the mounting diameters. The annular space has an annular shape formed when a reverse U-shaped space is rotated around the center axis of the cylinder 21 and the piston rod 22.

Note that the diaphragm 43 is fixed to the end member 41 or the rod side member 42 by winding metal caulking bands 47a and 47b from the outer peripheral side and performing caulking. The caulking bands 47a and 47b may have, for example, a C-ring shape as well as an annular shape.

As the diaphragm 43 is provided in the above manner, the air chamber 50 is formed around the cylinder 21 (end member 41) and the piston rod 22. The air is filled in the air chamber 50 and hermetically sealed. The diaphragm 43 rolls outer peripheries of the large-diameter cylindrical portion 41b of the end member 41 and the outer cylinder 21a of the cylinder 21 in accordance with extension/contraction of the damper body 20. Here, the air chamber 50 in which the air with a given pressure is filled configures an air spring which biases the damper body 20 in the extending direction. Accordingly, a spring force is generated in accordance with change of the volume in the air chamber 50 caused by extension/contraction of the damper body 20.

The bump rubber 44 restricts a compression side stroke. The bump rubber 44 has a tubular shape, which is provided inside the rod side member 42 as well as around the piston rod 22. A through hole is formed in a center of the bump rubber 44. A lower end of the bump rubber 44 is fitted to an annular concave portion 42d formed in the small-diameter cylindrical portion 42a of the rod side member 42. The bump rubber 44 is formed of, for example, urethane, urethane foam, rubber and so on.

An outer diameter of the small-diameter cylindrical portion 41a of the end member 41 is formed to be smaller than an inner diameter of the large-diameter cylindrical portion 42b of the rod side member 42, for example, for preventing contact between the end member 41 and the rod side member 42 in the compression-side stroke.

The diaphragm unit 40 may also have a tubular cover 48 which covers the outer periphery of the diaphragm 43 as shown in FIG. 3. A lower end (the other end) of the cover 48 is fixed to, for example, the large-diameter cylindrical portion 42b of the rod side member 42. An upper end (one end) of the cover 48 is open and is extended, for example, so as to pass an end portion of the diaphragm 43 on the upper side in the state where the suspension 10 is extended to the maximum as shown in FIG. 1. The cover 48 is formed of, for example, a metal material, a resin material or the like. An outer periphery of the diaphragm 43 is covered by the cover 48 as described above, therefore, damage, abrasion and the like of the diaphragm 43 caused by dust, stones and so on can be prevented.

Next, a method of mounting the diaphragm unit 40 in the suspension 10 according to the embodiment will be explained.

Figure 4:
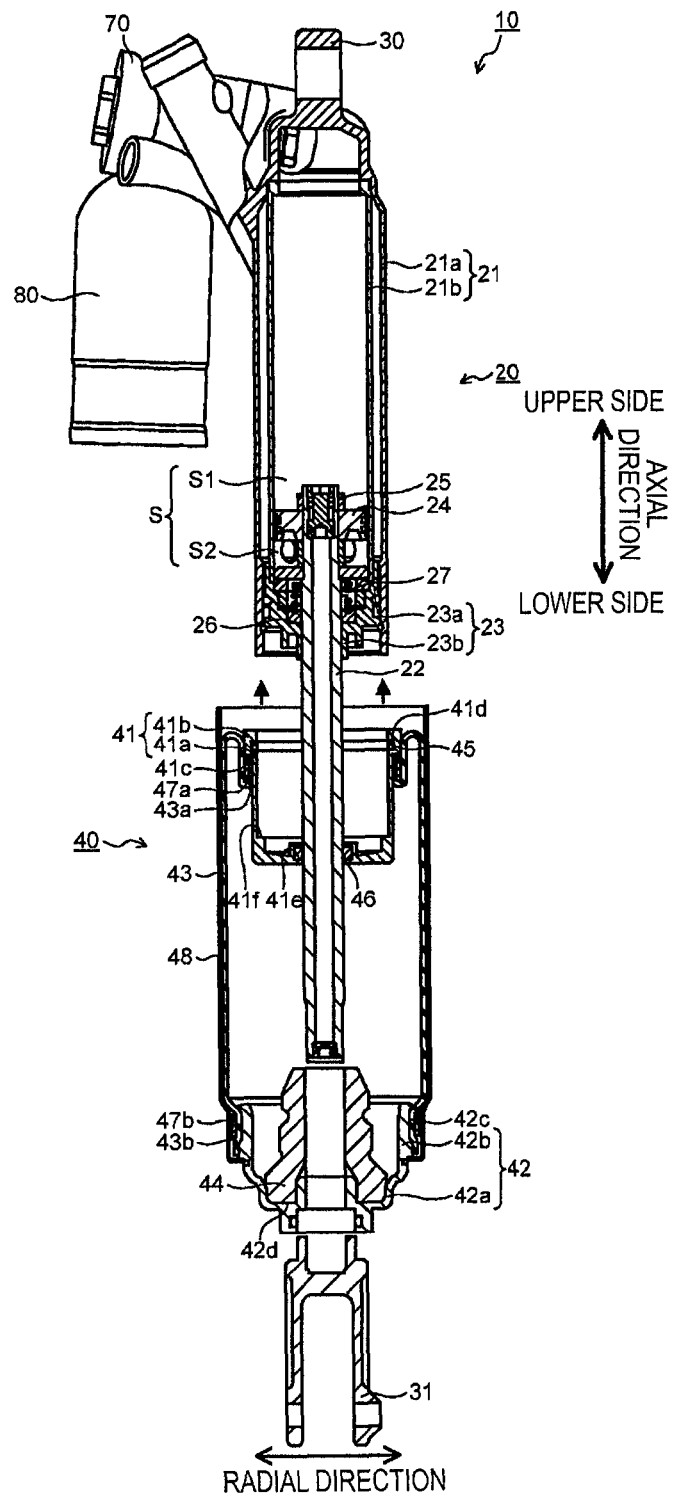
FIG. 4 is an exploded vertical cross section of the suspension according to the embodiment.

FIG. 4 is an exploded vertical cross-section of the suspension 10 according to the embodiment. FIG. 4 shows the state where the suspension 10 is extended to the maximum.

As shown in FIG. 4, an end of the lower side of the piston rod 22 is inserted into an opening on the bottom portion of the end member 41 of the diaphragm unit 40. The diaphragm unit 40 is moved to the upper side (an arrow direction of FIG. 4) in the axial direction to insert the end of the lower side of the piston rod 22 into the through hole at the center of the bump rubber 44.

The diaphragm unit 40 is further moved to the upper side in the axial direction, and the end member 41 is fitted around the outer cylinder 21a so as to cover the opening of the outer cylinder 21a of the cylinder 21. At this time, the end of the lower side of the piston rod 22 pierces through the bump rubber 44 and an opening in the bottom portion of the rod side member 42 to be extended to an outside of the rod side member 42.

Subsequently, the axle side mounting member 31 is screwed to the end of the lower side of the piston rod 22 extended to the outside of the rod side member 42. Accordingly, the diaphragm unit 40 is mounted to the damper body 20 to have structure shown in FIG. 1.

When the diaphragm unit 40 is mounted to the damper body 20 as described above, the air chamber 50 is formed around the cylinder 21 (end member 41) and the piston rod 22. The air is filled in the air chamber 50 from the pressure adjusting portion (not shown) of the rod side member 42. Reaction force can be adjusted by adjusting the pressure in the air chamber 50.

In a case where the diaphragm unit 40 is removed from the damper body 20, a reverse process of the above mounting method is performed.

Next, operations of the suspension 10 according to the embodiment will be explained.

Figure 5:
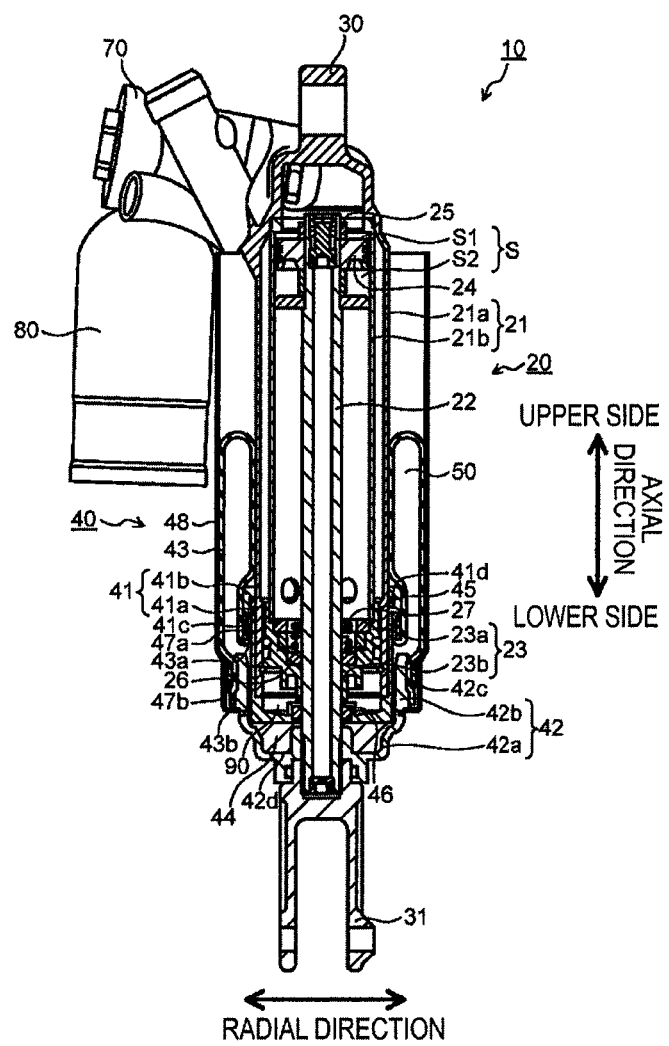
FIG. 5 is a view showing a vertical cross section of the suspension according to the embodiment.

The operations of the damper body 20, the damping force generating apparatus 70 and the reservoir 80 in the suspension 10 according to the embodiment are the same as operations of the related-art suspension having the coil spring, the damper body, the damping force generating apparatus and the reservoir. Accordingly, operation of the diaphragm unit 40 will be mainly explained here. FIG. 5 is a view showing a vertical cross section of the suspension 10 according to the embodiment. FIG. 5 shows a state where the suspension 10 is contracted to the minimum.

In the compression stroke, as the suspension 10 (damper body 20) is contracted from the state where the suspension 10 is extended to the maximum as shown in FIG. 1, the diaphragm 43 of the diaphragm unit 40 rolls to the upper side along a side surface of the outer cylinder 21a of the cylinder 21. At this time, the volume of the air chamber 50 changes in accordance with the contraction of the damper body 20. The reaction force is changed by the change of the volume.

Then, in a state where the suspension 10 is contracted to the minimum, the air chamber 50 will be an annular space formed between the outer cylinder 21a of the cylinder 21 and the cover 48 as shown in FIG. 5.

On the other hand, also when the suspension 10 is extended from the most-contracted state, the diaphragm 43 rolls to the lower side along the side surface of the outer cylinder 21a of the cylinder 21. At this time, change of the volume similar to the above change of the volume occurs. Then, the suspension 10 becomes in the state of being extended to the maximum (See FIG. 1).

There are few occasions where the suspension 10 mounted on the vehicle continuously changes from the most extended state to the most contracted state because, for example, the suspension 10 repeats extension and contraction irregularly. However, the suspension 10 mounted on the vehicle is also in any state between the most extended state and the most contracted state.

As described above, the diaphragm unit 40 according to the embodiment is formed so as to be attachable to and detachable from the damper body 20. Accordingly, for example, in an existing suspension including the coil spring, the diaphragm unit 40 according to the embodiment can be attached to the damper body by, for example, removing an end plate including a dust seal from a damper body. As described above, it is possible to change the existing suspension having the coil spring structure to the suspension having the air spring structure easily.

As a load, an inertia force and a bending load are lower in the suspension 10 having the air spring structure according to the embodiment as compared with the suspension having the coil spring structure, therefore, the actuation performance of the stroke is excellent. Also in the air spring structure, the reaction force can be adjusted easily by adjusting the pressure in the air chamber 50.

Also in the suspension 10 according to the embodiment, the air in the air chamber 50 is hardly affected by the temperature of the oil inside the cylinder 21 by providing the gap portion 90 between the inner bottom portion of the end member 41 and the outer bottom portion of the rod guide 23.

Accordingly, it is possible to suppress change in the reaction characteristics in accordance with temperature change of the air in the air chamber 50.

The example in which the rod guide 23 is fixed to the inner periphery of the opening of the lower end of the outer cylinder 21a in the liquid tight manner has been shown in the above embodiment, however, the present invention is not limited to this.

Figure 6:
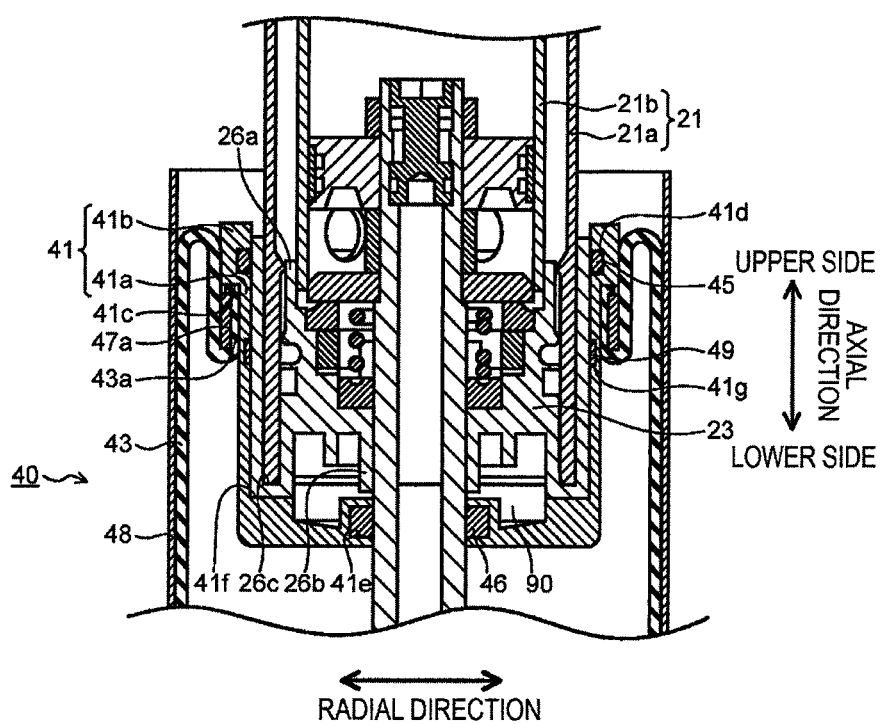
FIG. 6 is an enlarged view of a vertical cross section of a fitting portion with respect to an end member in a suspension according to another embodiment.
Figure 7:
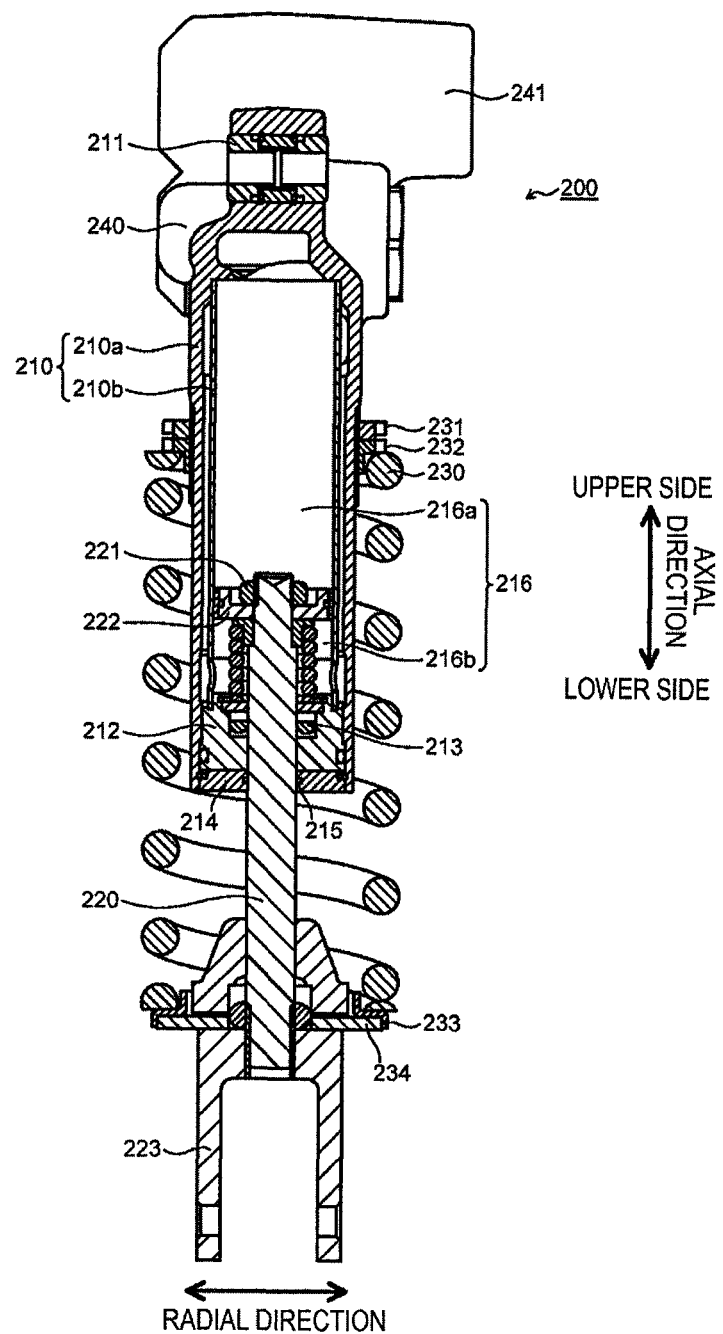
FIG. 7 is a view showing a vertical cross section of a suspension provided on a rear wheel side of a motorcycle in the related art.

FIG. 6 is an enlarged view of a vertical cross section of a fitting portion with respect to the end member 41 in the suspension 10 according to another embodiment. It is also preferable that an annular groove portion 26c is provided around an outer peripheral portion of the rod guide 23 and that the outer cylinder 21a of the cylinder 21 is fitted to the groove portion 26c in the liquid tight manner as shown in FIG. 6. The groove portion 26c has an annular shape formed when a U-shaped space is rotated around the center axis of the cylinder 21 and the piston rod 22.

In this case, the end member 41 is detachably fitted to an outer periphery of the rod guide so as to cover the rod guide 23 as shown in FIG. 6. A groove portion 41g is formed in an inner periphery portion of the small-diameter cylindrical portion 41a of the end member 41 in a circumferential direction. An air seal 49 is fitted to the groove portion 41g. The end member 41 is fitted to the outer periphery of the rod guide 23 in the air tight manner by the air seal 49. The upper end 43a of the diaphragm 43 is fixed, for example, to the outer peripheral surface of the small-diameter cylindrical portion 41a on the step portion 41c side in the same manner as the structure shown in FIG. 1.

Also in structure in which the end member 41 of the diaphragm unit 40 is detachably fitted to the outer periphery of the rod guide as described above, the operation and effect similar to the operation and effect in the diaphragm unit 40 shown in FIG. 3 and the suspension 10 shown in FIG. 1 can be obtained.

Here, the diaphragm unit 40 and the suspension 10 having the diaphragm unit 40 according to the embodiments can be applied to, for example, a rear suspension (rear cushion) of a motorcycle.

Although the example in which the damping force generating apparatus and the reservoir are provided outside the damper body has been shown as the suspension in the above embodiments, structure of the embodiments can be also applied to a suspension in which the damping force generating apparatus and the reservoir are provided inside the damper body. In this case, the temperature of the oil increases when the flow of the oil is damped in the damping force generating apparatus. Accordingly, for example, the temperature of the oil inside the cylinder 21 is increased as compared with the case of the suspension in which the damping force generating apparatus and the reservoir are provided outside the damper body. However, even when the temperature of the oil inside the cylinder 21 is increased, variation in temperature of the air in the air chamber 50 caused by the temperature of the oil inside the cylinder 21 can be suppressed by heat insulation effect due to the gap portion 90 provided between the inner bottom portion of the end member 41 and the outer bottom portion of the rod guide 23.

Some embodiments of the present invention have been explained and these embodiments have been cited as examples, which are not intended to limit the scope of the invention. The novel embodiments can be achieved in other various forms, in which various omission, alternations and modifications may occur within a scope not departing from the gist of the invention. These embodiments and modifications thereof are included in the scope and the gist of the invention as well as included in the inventions described in claims and the scope equivalent to the inventions.

What is claimed is:

1. A diaphragm unit for attachment to a damper body, the damper body comprising:
   a cylinder in which a liquid is sealed;
   a piston rod having a piston sliding inside the cylinder on an upper side of the piston rod, in which a lower side of the piston rod is extended to an outside of the cylinder; and
   a rod guide having a bottomed cylindrical shape wherein a first insertion opening, into which the piston rod is inserted, is provided at a bottom end portion of the rod guide, the rod guide being fixed to a side of an opening of the cylinder into which the piston is inserted to thereby make the piston rod be slidably inserted in a liquid tight manner, wherein
   the diaphragm unit is configured to be detachably attached to the damper body as a single unit and comprises:
   an end member having a bottomed cylindrical shape wherein a second insertion opening, into which the piston rod is inserted, is provided at a bottom portion of the end member, the end member being detachably fitted to an outer periphery of the cylinder or the rod guide so as to cover the opening of the cylinder or the rod guide;
   an air seal that is provided at an inner peripheral portion of the second insertion opening of the end member and allows the piston rod to be slidable in an air tight manner;
   a rod side member having a bottomed cylindrical shape wherein a third insertion opening, into which the piston rod is inserted, is provided at a bottom end portion of the rod side member, the rod side member being provided in a position around the lower side of the piston rod;
   an annular bump rubber fixed to an inner bottom portion of the rod side member and having a through hole into which the piston rod is inserted; and
   a tubular diaphragm having an upper end portion and a lower end portion, wherein
   the upper end portion of the tubular diaphragm is fixed to an upper end portion of the end member, and
   the lower end portion of the tubular diaphragm is fixed to the rod side member.

2. The diaphragm unit according to claim 1, wherein a gap portion is formed between an inner surface of a bottom portion of the end member and an outer surface of a bottom portion of the rod guide when the diaphragm unit is mounted to the damper body.

3. The diaphragm unit according to claim 1, wherein an air chamber is formed around the cylinder and the piston rod when the diaphragm unit is mounted to the damper body.

4. The diaphragm unit according to claim 2, wherein an air chamber is formed around the cylinder and the piston rod when the diaphragm unit is mounted to the damper body.

5. The diaphragm unit according to claim 1, wherein the end member, the air seal, the rod side member, the bump rubber and the diaphragm are formed as one unit.

6. The diaphragm unit according to claim 2, wherein the end member, the air seal, the rod side member, the bump rubber and the diaphragm are formed as one unit.

7. The diaphragm unit according to claim 3, wherein the end member, the air seal, the rod side member, the bump rubber and the diaphragm are formed as one unit.

8. The diaphragm unit according to claim 4, wherein the end member, the air seal, the rod side member, the bump rubber and the diaphragm are formed as one unit.

9. The diaphragm unit according to claim 1, further comprising: a tubular cover wherein one end of the cover is fixed to the rod side member and other end of the cover opens to cover an outer periphery of the diaphragm.

10. The diaphragm unit according to claim 2, further comprising: a tubular cover wherein one end of the cover is fixed to the rod side member and other end of the cover opens to cover an outer periphery of the diaphragm.

11. The diaphragm unit according to claim 3, further comprising: a tubular cover wherein one end of the cover is fixed to the rod side member and other end of the cover opens to cover an outer periphery of the diaphragm.

12. The diaphragm unit according to claim 4, further comprising: a tubular cover wherein one end of the cover is fixed to the rod side member and other end of the cover opens to cover an outer periphery of the diaphragm.

13. The diaphragm unit according to claim 1, wherein the second insertion opening is provided at one end of the end member where the tubular diaphragm is not fixed.

14. The diaphragm unit according to claim 1, wherein the end member includes a small-diameter portion and a large-diameter portion, which have different outer diameters and same inner diameters.

15. The diaphragm unit according to claim 1, wherein the upper end portion of the tubular diaphragm is fixed to an outer circumferential surface of the end member.

16. The diaphragm unit according to claim 14, wherein a first section of the upper end portion of the tubular diaphragm seats against the small-diameter portion and a second section of the upper end portion of the tubular diaphragm seats against the large-diameter portion of the end member.

17. The diaphragm unit according to claim 14, wherein a shoulder is formed along an outer surface of the end member between the small-diameter portion and the large-diameter portion, the upper end portion of the tubular diaphragm having a free terminating end that seats against the shoulder.

18. A suspension comprising:
a damper body comprising:
  a cylinder in which a liquid is sealed;
  a piston rod having a piston sliding inside the cylinder on an upper side of the piston rod, in which a lower side of the piston rod is extended to an outside of the cylinder; and
  a rod guide having a bottomed cylindrical shape wherein a first insertion opening, into which the piston rod is inserted, is provided at a bottom end portion of the rod guide, the rod guide being fixed to a side of an opening of the cylinder into which the piston is inserted to thereby make the piston rod be slidably inserted in a liquid tight manner;
a diaphragm unit that is configured to be detachably attached to the damper body as a single unit, the diaphragm unit comprising:
  an end member having a bottomed cylindrical shape wherein a second insertion opening, into which the piston rod is inserted, is provided at a bottom portion of the end member, the end member being detachably fitted to an outer periphery of the cylinder or the rod guide so as to cover the opening of the cylinder or the rod guide;
  an air seal that is provided at an inner peripheral portion of the insertion opening of the end member and allows the piston rod to be slidable in an air tight manner;
  a rod side member having a bottomed cylindrical shape wherein a third insertion opening, into which the piston rod is inserted, is provided at a bottom end portion of the rod side member, the rod side member being provided in a position around the lower side of the piston rod;
  an annular bump rubber fixed to an inner bottom portion of the rod side member and having a through hole into which the piston rod is inserted; and
  a tubular diaphragm having an upper end portion and a lower end portion, wherein
  the upper end portion of the tubular diaphragm is fixed to an upper end portion of the end member, and
  the lower end portion of the tubular diaphragm is fixed to the rod side member to thereby form an air chamber around the cylinder and the piston rod.

19. The suspension according to claim 18, wherein a gap portion is formed between an inner surface of a bottom portion of the end member and an outer surface of a bottom portion of the rod guide.

20. The suspension according to claim 18, wherein an oil seal is provided at an inner peripheral portion of the first insertion opening.

21. The suspension according to claim 19, wherein an oil seal is provided at an inner peripheral portion of the first insertion opening.

22. The suspension according to claim 18, wherein the end member, the air seal, the rod side member, the bump rubber and the diaphragm constitutes a diaphragm unit as one unit, and the diaphragm unit is configured so as to be detachable.

23. The suspension according to claim 19, wherein the end member, the air seal, the rod side member, the bump rubber and the diaphragm constitutes a diaphragm unit as one unit, and the diaphragm unit is configured so as to be detachable.

24. The suspension according to claim 18, further comprising: a tubular cover in which one end opens and other end is fixed to the rod side member to cover an outer periphery of the diaphragm.

25. The suspension according to claim 19, further comprising: a tubular cover in which one end opens and other end is fixed to the rod side member to cover an outer periphery of the diaphragm.

26. The suspension according to claim 18, wherein the end member includes a small-diameter portion and a large-diameter portion, which have different outer diameters and same inner diameters.

27. The suspension according to claim 18, wherein the upper end portion of the tubular diaphragm is fixed to an outer circumferential surface of the end member.

* * * * *